(12) United States Patent
Moon et al.

(10) Patent No.: US 8,713,028 B2
(45) Date of Patent: Apr. 29, 2014

(54) RELATED NEWS ARTICLES

(75) Inventors: Taesup Moon, Pleasanton, CA (US);
Zhaohui Zheng, Mountain View, CA (US); Yi Chang, Sunnyvale, CA (US);
Pranam Kolari, Santa Clara, CA (US);
Xuanhui Wang, Santa Clara, CA (US);
Yuanhua Lv, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 225 days.

(21) Appl. No.: 13/298,932

(22) Filed: Nov. 17, 2011

(65) Prior Publication Data
US 2013/0132401 A1     May 23, 2013

(51) Int. Cl.
*G06F 17/30* (2006.01)

(52) U.S. Cl.
USPC ................................. 707/748; 707/E17.084

(58) Field of Classification Search
CPC ................. G06F 17/30864; G06F 17/30967; G06F 17/30994; G06F 17/30899; Y10S 707/99932; G06Q 30/0631; H04N 21/4826
USPC ............................ 707/748, E17.084, 999.002
See application file for complete search history.

(56) References Cited

U.S. PATENT DOCUMENTS

| | | | |
|---|---|---|---|
| 6,317,722 B1 * | 11/2001 | Jacobi et al. | 705/14.51 |
| 6,542,869 B1 * | 4/2003 | Foote | 704/500 |
| 6,850,949 B2 * | 2/2005 | Warner et al. | 1/1 |
| 6,912,505 B2 * | 6/2005 | Linden et al. | 705/14.53 |
| 7,293,019 B2 * | 11/2007 | Dumais et al. | 707/754 |
| 7,412,442 B1 * | 8/2008 | Vadon et al. | 1/1 |
| 7,451,120 B1 * | 11/2008 | Kumar et al. | 706/12 |
| 7,483,871 B2 * | 1/2009 | Herz | 1/1 |
| 7,533,091 B2 * | 5/2009 | Plastina et al. | 705/26.1 |
| 7,548,934 B1 * | 6/2009 | Platt et al. | 1/1 |
| 7,716,226 B2 * | 5/2010 | Barney | 707/748 |
| 7,730,073 B2 * | 6/2010 | McKee et al. | 707/749 |
| 7,743,062 B2 * | 6/2010 | Perrone | 707/748 |
| 7,971,150 B2 * | 6/2011 | Raskutti et al. | 715/764 |
| 8,140,449 B1 * | 3/2012 | Kumar et al. | 706/12 |
| 8,244,564 B2 * | 8/2012 | Selinger et al. | 705/7.11 |
| 8,380,723 B2 * | 2/2013 | Radlinski et al. | 707/748 |
| 8,402,019 B2 * | 3/2013 | Jin et al. | 707/723 |
| 8,600,984 B2 * | 12/2013 | Fleischman et al. | 707/725 |
| 8,639,693 B1 * | 1/2014 | Hawkins et al. | 707/736 |

(Continued)

OTHER PUBLICATIONS

Lv et al., "Learning to Model Relatedness for News Recommendation", ACM, WWW 2011, Mar. 28-Apr. 1, 2011, Hyderabad, India, 10 pages.*

(Continued)

*Primary Examiner* — Phuong Thao Cao
(74) *Attorney, Agent, or Firm* — Martine Penilla Group, LLP

(57) ABSTRACT

Methods, systems, and computer programs are presented for providing internet content, such as related news articles. One method includes an operation for defining a plurality of candidates based on a seed. For each candidate, scores are calculated for relevance, novelty, connection clarity, and transition smoothness. The score for connection clarity is based on a relevance score of the intersection between the words in the seed and the words in each of the candidates. Further, the score for transition smoothness measures the interest in reading each candidate when transitioning from the seed to the candidate. For each candidate, a relatedness score is calculated based on the calculated scores for relevance, novelty, connection clarity, and transition smoothness. In addition, at least one of the candidates is selected based on their relatedness scores for presentation to the user.

19 Claims, 9 Drawing Sheets

(56) References Cited

U.S. PATENT DOCUMENTS

| | | | |
|---|---|---|---|
| 8,642,872 B2* | 2/2014 | Lu et al. | 84/615 |
| 2003/0144995 A1* | 7/2003 | Franz et al. | 707/3 |
| 2005/0102251 A1* | 5/2005 | Gillespie | 707/1 |
| 2005/0198056 A1* | 9/2005 | Dumais et al. | 707/101 |
| 2005/0262528 A1* | 11/2005 | Herley et al. | 725/19 |
| 2006/0032363 A1* | 2/2006 | Platt | 84/601 |
| 2006/0089924 A1* | 4/2006 | Raskutti et al. | 707/1 |
| 2007/0208771 A1* | 9/2007 | Platt | 707/102 |
| 2009/0063469 A1* | 3/2009 | Gross | 707/5 |
| 2009/0138304 A1* | 5/2009 | Aharoni et al. | 705/7 |
| 2011/0087701 A1* | 4/2011 | Eyres et al. | 707/780 |
| 2011/0213655 A1* | 9/2011 | Henkin et al. | 705/14.49 |
| 2011/0252025 A1* | 10/2011 | Jin et al. | 707/725 |
| 2011/0289421 A1* | 11/2011 | Jordan et al. | 715/739 |
| 2012/0251011 A1* | 10/2012 | Gao et al. | 382/224 |
| 2013/0046766 A1* | 2/2013 | Shishido et al. | 707/741 |
| 2013/0073382 A1* | 3/2013 | Henkin et al. | 705/14.49 |
| 2013/0073568 A1* | 3/2013 | Federov et al. | 707/749 |
| 2013/0086470 A1* | 4/2013 | Dorr et al. | 715/256 |
| 2013/0124512 A1* | 5/2013 | Ismalon | 707/723 |

OTHER PUBLICATIONS

Chen et al., "Novelty Paper Recommendation Using Citation Authority Diffusion", In 2011 Conference on Technologies and Applications of Artificial Intelligence, IEEE Computer Society, 2011, pp. 126-131.*

Swezey et al., "Intelligent Page Recommender Agents: Real-Time Content Delivery for Articles and Pages Related to Similar Topics", Modern Approach in Applied Intelligence, Proceedings 24th International Conference on Industrial Engineering and other Applications of Applied Intelligent Systems (IEA/AIE 2011), Part II, LNAI 6704, pp. 173-182, 2011.*

Li et al., "Unbiased Offline Evaluation of Contextual-bandit-based News Article Recommendation Algorithms", WSDM' 11, Feb. 9-12, 2011, Hong Kong, China, 2011, 10 pages.*

* cited by examiner

Fig. 2

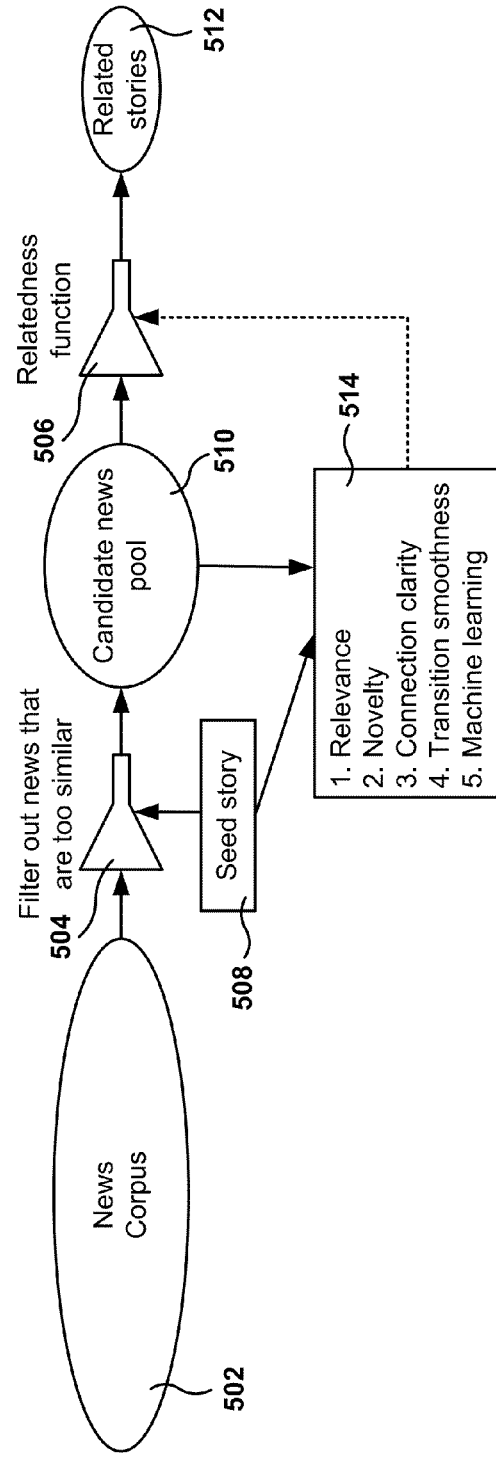

| Relatedness | Seed news | Candidate news | |
|---|---|---|---|
| Very related | Polish leader, 96 others dead in Russia jet crash | List of some of those who died in the crash of the Polish presidential plane in Russia | 1 |
| | Toyota dismisses account of runaway Prius | What to do if your car suddenly accelerates | 2 |
| Somewhat related | Toyota dismisses account of runaway Prius | Toyota to build Prius at third Japan plant: report | 3 |
| Redundant | Obama, McCain pledge to work together for reform | Obama, McCain vow to work together, reform government | 4 |
| | White House: Obamas earn $5.5 million in 2009 | Obama's oil spill bill seeks $118 million, oil company tax increase | 5 |
| Unrelated | Polish leader, 96 others dead in Russia jet crash | Tax rows roll on in election campaign | 6 |

Results for Title, Abstract, and Body

| Metric | Title | | | |
|---|---|---|---|---|
| | lm-dir | lm-jm | cosine | BM25 |
| NDCG1 | 0.5859 | 0.5712 | 0.5660 | 0.6093 |
| NDCG3 | 0.5783 | 0.5812 | 0.5836 | 0.6050 |
| NDCG5 | 0.5911 | 0.5900 | 0.5958 | 0.6162 |
| NDCG10 | 0.6285 | 0.6305 | 0.6369 | 0.6536 |

| Metric | Abstract | | | |
|---|---|---|---|---|
| | lm-dir | lm-jm | cosine | BM25 |
| NDCG1 | 0.6253 | 0.6192 | 0.6076 | 0.6340 |
| NDCG3 | 0.6171 | 0.6234 | 0.6104 | 0.6334 |
| NDCG5 | 0.6319 | 0.6314 | 0.6269 | 0.6440 |
| NDCG10 | 0.6615 | 0.6630 | 0.6624 | 0.6753 |

| Metric | Body | | | |
|---|---|---|---|---|
| | lm-dir | lm-jm | cosine | BM25 |
| NDCG1 | 0.7057 | 0.6930 | 0.6841 | 0.7027 |
| NDCG3 | 0.7033 | 0.7079 | 0.6887 | 0.7042 |
| NDCG5 | 0.7098 | 0.7152 | 0.6983 | 0.7133 |
| NDCG10 | 0.7421 | 0.7443 | 0.7330 | 0.7448 |

Connection Clarity & Transition Smoothness improve relatedness function

RELATED NEWS ARTICLES

BACKGROUND

1. Field of the Invention

The present invention relates to methods for selecting internet content for presentation to a user, and more particularly, methods, systems, and computer programs for presenting news articles related to a news article selected by a user.

2. Description of the Related Art

The recent decade has witnessed an explosive growth of online news. According to a recent report, more than 123 million people visited news websites such as Yahoo!™ News in May 2010, representing 57 percent of the total U.S. internet audience, with each visitor reading 43 pages on average. These numbers have been steadily increasing over the past years and show the growing appeal of reading news online.

Recommending interesting news articles to users has become extremely important for internet providers looking to maintain users' interest. While existing Web services, such as Yahoo! and Digg™, attract users' initial clicks, methods to engage users after their initial visit is largely under explored.

One important advantage of online news over traditional newspapers is that the former can be augmented with hyperlinks to other related news. When a user is reading a news article, the user may also be interested in related articles that logically flow from the content of the current page. This process is referred to herein as post-click news recommendation, which has the goal of promoting users' navigation to other web pages. However, if the recommended articles are not logically related to the article being read, the recommended articles will fail to capture user interest, and users' overall satisfaction will decrease. Therefore, an effective post-click news recommendation is critical to online news websites.

In some solutions today, post-click news recommendation is typically done by editors that search through a corpus of news documents. The process is expensive and cumbersome, and is also limited by the editors' familiarity with the news topics.

It is in this context that embodiments arise.

SUMMARY

Embodiments of the present invention provide methods, systems, and computer programs for providing internet content, such as related news articles. It should be appreciated that the present invention can be implemented in numerous ways, such as a process, an apparatus, a system, a device or a method on a computer readable medium. Several inventive embodiments of the present invention are described below.

In one embodiment, a method includes an operation for defining a plurality of candidates based on a seed. For each candidate, scores are calculated for relevance, novelty, connection clarity, and transition smoothness. The score for connection clarity is based on a relevance score of the intersection between the words in the seed and the words in each of the candidates. Further, the score for transition smoothness measures the interest in reading each candidate when transitioning from the seed to the candidate. For each candidate, a relatedness score is calculated based on the calculated scores for relevance, novelty, connection clarity, and transition smoothness. In addition, at least one of the candidates is selected based on their relatedness scores for presentation to the user, where at least one operation of the method is executed through a processor.

In another embodiment, a computer program embedded in a non-transitory computer-readable storage medium, when executed by one or more processors, provides internet content, the computer program including program instructions for defining a plurality of candidates based on a seed, and program instructions for calculating, for each candidate, scores for relevance, novelty, connection clarity, and transition smoothness. The score for connection clarity is based on a relevance score of an intersection between the seed and each candidate, and the score for transition smoothness measures an interest in reading each candidate when transitioning from the seed to the candidate. The computer program further includes program instructions for calculating, for each candidate, a relatedness score based on the calculated scores for relevance, novelty, connection clarity, and transition smoothness. In addition, at least one candidate from the plurality of candidates is selected based on the relatedness scores of the candidates.

In yet another embodiment, a method for providing news articles includes an operation for defining a plurality of news candidates based on a seed article selected by a user. For each news candidate, scores for relevance, novelty, connection clarity, and transition smoothness are calculated. The score for connection clarity is based on a relevance score of an intersection between the words in the seed article and the words in each candidate, and the score for transition smoothness measures an interest in reading each news candidate when transitioning from the seed article to each news candidate. Additionally, for each news candidate, calculating a relatedness score is calculated based on the calculated scores for relevance, novelty, connection clarity, and transition smoothness. In addition, the method includes another operation for selecting, based on the relatedness scores, a subset of news candidates from the plurality of news candidates for presentation to the user, where at least one operation of the method is executed through a processor.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

FIG. 2 shows a search-results page for a news query, according to one embodiment.

FIG. 4 includes a table illustrating the relationship between seed news and related news, according to one embodiment.

FIG. 5 illustrates a method for finding related stories, according to one embodiment.

DETAILED DESCRIPTION

Embodiments of the invention enable an Internet news provider to automatically identify news articles that are related to a news article selected by a user. In one embodiment, a relatedness function is defined based on four metrics: relevance, novelty, connection clarity, and transition smoothness. In order to quantitatively evaluate the relatedness function, in one embodiment, a large test collection based is built based on a four-month commercial news corpus with editorial judgments. The experimental results show that the proposed heuristics can capture relatedness, and that the learned unified relatedness function works effectively.

It will be apparent, that the present embodiments may be practiced without some or all of these specific details. In other instances, well known process operations have not been described in detail in order not to unnecessarily obscure the present embodiments.

Figure 1:
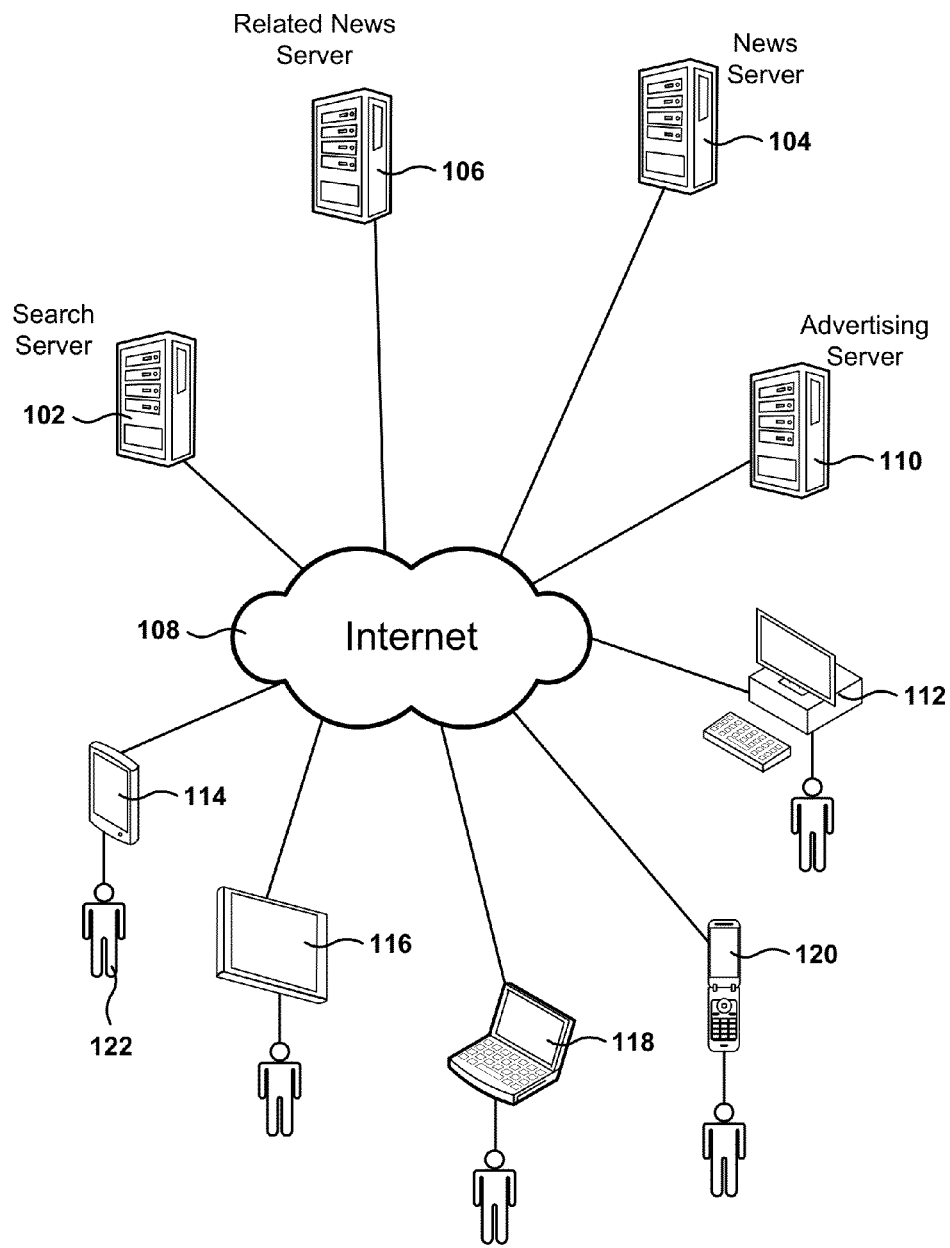
FIG. 1 is a simplified schematic diagram of a computer system for implementing embodiments of the present invention.

FIG. 1 is a simplified schematic diagram of a computer system for implementing embodiments of the present invention. Internet 108 is used to interconnect users with servers. Users 122 access Internet 108 via a variety of the devices, such as smart phone 114, tablet 116, laptop 118, mobile phone 120, personal computer 112, etc. These are merely examples, and any other device used to access Internet 108 can be used to implement embodiments of this invention. For example, the devices may be wired or wireless. In one embodiment, a browser is executed on a device, and the graphical user interface is presented on a display. The browser provides the functionality for accessing the Internet.

Search server 102, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 104 provides news to users. One example of a news server is Yahoo!® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

Related news server 106 searches news articles that are related to the user activity, such as when the user is reading a news article, looking at product information, reading a blog, etc. Related news server 106 may utilize information from news server 104, search server 102, advertising server 110, etc. Embodiments of the invention described below present methods for identifying news items that are related to the user current activity.

Advertising server 110 provides ad delivery to Internet users from publishers, also referred to as advertisers. An Internet ad is a commercial message. Today there are already many established relationships between advertisers and content providers. For example, popular bloggers can make money from their blogs through advertisement placed in their blog pages. Advertisers are willing to pay content providers for attracting users to their websites, increasing brand name recognition, selling their products or services, etc.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 2:
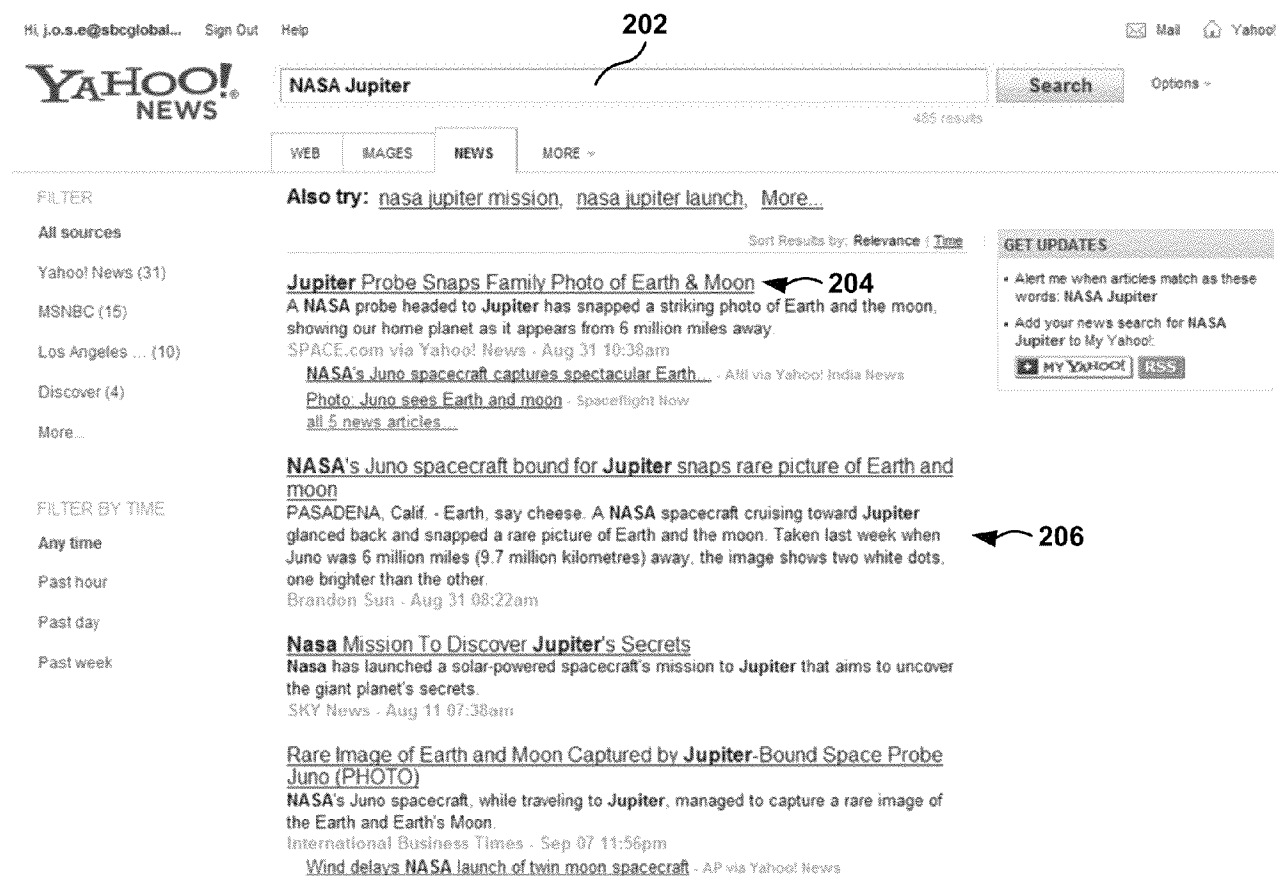

FIG. 2 shows a search-results page for a news query, according to one embodiment. It should be noted that although some embodiments herein are described in reference to news search, the same principles can be applied in other areas, such as content-oriented sites, social networking, product pages, blogs, company websites, etc.

In one embodiment, the news results page looks similar to an Internet search results page. The news search page includes a search field 202 that allows the user to enter terms for the news query. After the user submits a query (e.g., "NASA Jupiter"), the news engine delivers the news results. In one embodiment, each news result includes, at least, a title 204 and an abstract 206. Title 204 provides a short description of the content of the news article, and the abstract 206 provides a synopsis of the content of the news article.

Once the user clicks on a news article, the Internet browser accesses the referenced webpage to present the news article. In one embodiment, the textual content of the news article is referred to herein as the body of the news article. In other embodiments, the news article include one or more of a title, a body, a summary, one or more pictures, a video clip, user comments, statistical information about the page, etc. On the right side of the page, an advertising area includes a list of advertisements, which are sometimes related to the topic of the search.

It should be noted that the embodiments illustrated in FIG. 2 are exemplary. Other embodiments may utilize different fields, locate fields in different parts of the page, or provide different types of information. The embodiments illustrated in FIG. 2 should therefore not be interpreted to be exclusive or limiting, but rather exemplary or illustrative.

Figure 3:
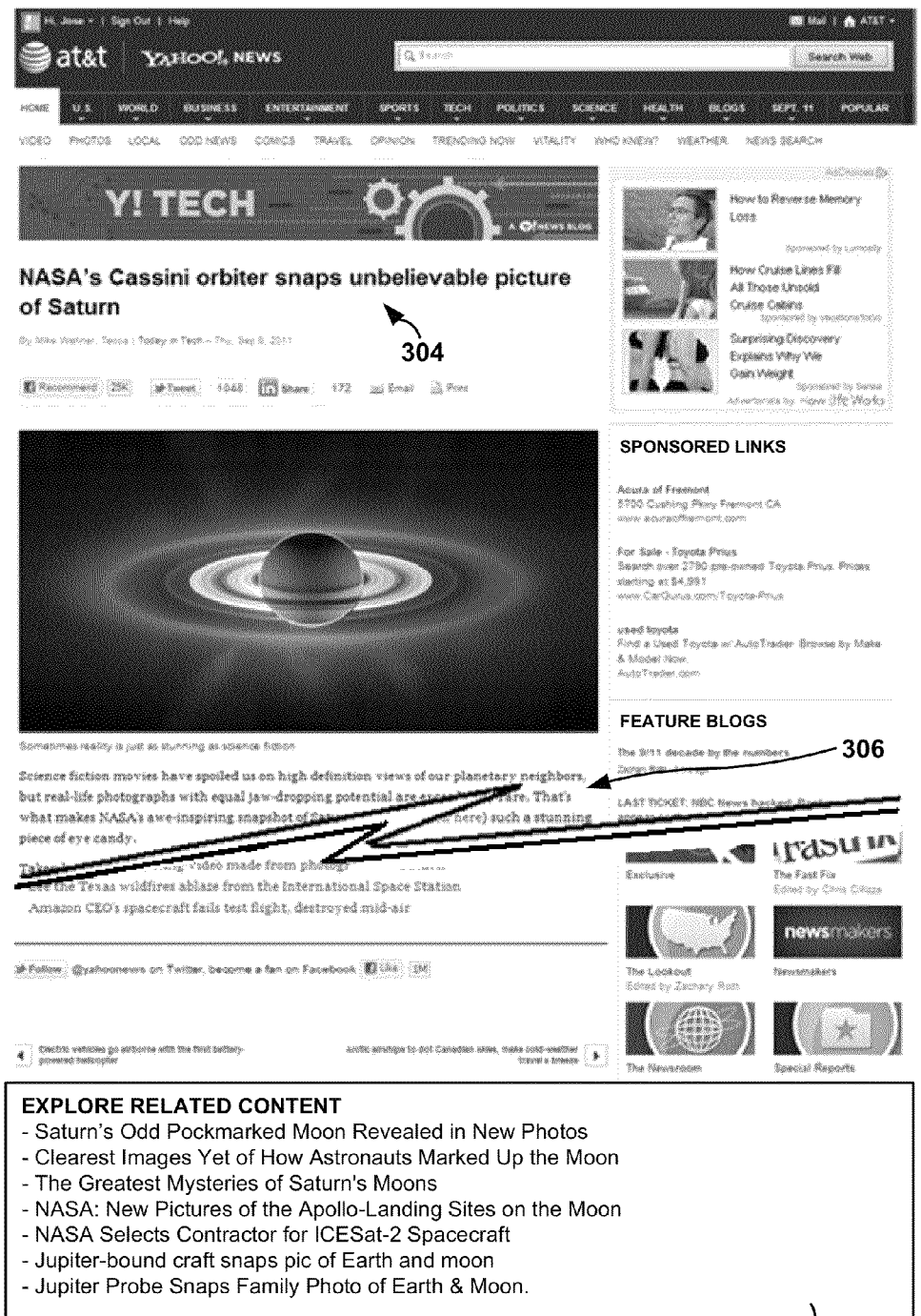
FIG. 3 shows a news article with links to related content, according to one embodiment.

FIG. 3 shows a news article with links to related content, according to one embodiment. A typical news article includes, at least, a title 304 and a body 306. The title 304 provides a headline for the article, and the body 306 includes a textual description of the news article. In some cases, the news article may include one or more pictures, and one or more multimedia segments.

Embodiments of the invention provide a related content section 302, which includes one or more links to related news articles. What makes a news article related to the current news article? First of all, two news articles should be contextually similar to each other. In this sense, similarity or relevance is an important indicator of relatedness. This indicator can be captured through standard information retrieval models. However, similarity or relevance is not a sufficient measurement of relatedness, because there is a difference between news recommendation and traditional information retrieval. For a related article to be recommended, the related article should cover only a fraction of the content of the article be read, and include other content that is novel and news-worthy.

Information Retrieval (IR) models usually favor documents that are similar to the seed document, yet such documents are not really valuable to a user reading the current news article, because the content is the same, or at least very similar. This is why, novelty, is also used as a signal of relatedness. It is well known that some retrieval functions (e.g., cosine similarity) are also effective measures for novelty and redundancy detection. In addition to the notions of similarity and novelty, two new factors for measuring relatedness are introduced below: connection clarity and transition smoothness.

FIG. 4 includes a table illustrating the relationship between seed news and related news, according to one embodiment. The table of FIG. 4 includes a first column that indicates how related the seed article and the candidate news article are. In one embodiment, the relatedness function may have one of four possible values: very related, somewhat related, redundant, and unrelated, but other embodiments may include different amount of categories or scoring methods.

The second column includes the seed news article, the third column has a potential candidate article, and the last column has a numeral identifying the different rows in the table. To find related news articles, there should be a clear connection between two documents to maintain topical continuity. In other words, the overlap between two documents should be comprised of some meaningful topical context. However, word overlap that is able to capture relevance and novelty may not always capture topical continuity.

The overlap of words like "Obama," "million," and "dollar" is not discriminative enough to represent a specific topic (example 5). As a consequence, the seed and the candidate articles are not well connected. A new metric, connection clarity, is introduced to account for this factor.

The stories in the two articles should also be of continuity of senses so that a user's reading interest can transit from one to the other smoothly. In general, it is smoother to transit from a seed of "Toyota dismisses account of runaway Prius" to a candidate article of "What to do if your car suddenly accelerates" (example 2), than to transit to a candidate article of "Toyota to build Prius at 3rd Japan plant" (example 3), although both candidate articles satisfy the three properties of relevance, novelty, and connection clarity. A fourth signal, transition smoothness, is introduced to measure the likelihood that the two stories can be combined into a single article in a natural way. The basic idea is that, if human editors would like to put two stories together under some context, this means that the two stories are in a smooth transition, at least from the editors' perspective.

FIG. 5 illustrates a method for finding related stories, according to one embodiment. Given the current news article that a user is reading, the goal is to extract, from a corpus 502 of news articles, a list of related articles 512 that the user would like to read after selecting the current news article, also referred to herein as the seed article.

As used herein, a seed article s 508 is a news article, from the news corpus C, that has been selected by a user. The seed article is also referred to herein sometimes as the seed. In one embodiment, textual news articles are utilized for searching related news articles. Typically, a news article includes, at least, a title, an abstract, and a body. For example, the title of a seed may be "Toyota dismisses account of runaway Prius."

Further, a candidate news article d 510, sometimes referred to as the candidate, is a news article from the news corpus C that is being considered as a recommendation to the user when the user has selected the seed s. For example, a candidate for the seed "Toyota dismisses account of runaway Prius" is the article titled "What to do if your car suddenly accelerates."

A Relatedness Function $f$ is used to estimate a relatedness score of a candidate d given a seed article s, and is represented as $f(s, d)$. The relatedness score denotes how related the candidate is to the seed. If $d_1$ and $d_2$ are two candidate news articles, $d_1$ is a better article to recommend than $d_2$ (i.e., $d_1$ is more related to s) if $f(s, d_1) > f(s, d_2)$.

Given a seed article s, the goal of the method to generate post-click news recommendation is to identify a set of candidate articles $D=\{d_1, \ldots, d_m\}$, and to design a relatedness function $f$ 506 to score each candidate as $f(s, d_1)$, in order to select the articles that better relate to s. A ranked list 512 of n candidates is selected having the highest relatedness scores $D_s = \{d_{s,1}, \ldots, d_{s,n}\}$ for s.

Identifying candidate articles is relatively straightforward. Although relevance alone is not sufficient to capture relatedness, two related documents should at least share some similar content. On the other hand, duplicate or near duplicate documents are typically not good candidate documents, and, in one embodiment, a redundancy removal 504 is performed to filter candidates that are identical, or almost identical, to the seed article. In one embodiment, a two stage approach is utilized, by first using a standard information retrieval model to retrieve a set of documents using the seed article as a query, and then by removing relatively obvious redundant articles to obtain the pool of candidate news articles 510.

As previously mentioned, relatedness represents how well a candidate is related to a seed. To model relatedness, several signals 514 are utilized: relevance, novelty, connection clarity, and machine learning. A related document should share some similar content with the seed document. For example, the two news articles in example 6 of FIG. 4 are too dissimilar to each other, and clearly are not related.

The notion of relevance in information retrieval, which measures to what extent the topic of a candidate document matches the topic of the query, is a natural aspect of relatedness. A variety of retrieval models have been developed for information retrieval to model relevance, such as vector space model, classic probabilistic model, and language models. Some representative retrieval models were evaluated to determine how well each model works for finding related articles given a seed article.

On the other hand, if two news articles are too similar to each other, it is clear that a user may not be interested in one given that the user has already read the other, since there may be no novel information in the other article. For example, it is not desirable to recommend the candidate article of example 4 in FIG. 4 because it is virtually identical to the seed article. Thus, documents that are too similar are considered as not related in our definition of relatedness.

Novelty is another valuable signal for scoring relatedness. Novelty is often contrary to relevance, especially in the context of finding the relationship between two documents. Many retrieval functions (e.g., cosine similarity) are effective measures for both novelty and redundancy detection. Therefore, the same set of features is utilized for capturing both relevance and novelty, leaving the machine learning algorithm to find a balance between their dual roles.

In one embodiment, several retrieval functions are evaluated, e.g., cosine similarity, BM25, language models with Dirichlet prior smoothing, and language models with Jelinek-Mercer smoothing, which are some of the most utilized information retrieval models. However, other retrieval functions may also be utilized according to the principles presented herein.

The retrieval functions capture both relevance and novelty in a single "relevance" score. As a result, if such a "relevance" score is used to rank documents, without properly balancing their two roles (i.e., relevance and novelty), the top-ranked documents may be dominated by redundant or unrelated articles, which would hurt the precision of finding the top documents.

In one embodiment, passage retrieval is utilized to relax this problem. For a related document, it would be encouraged that only a portion shares similar content with the seed article, while other parts are mostly about some novel topics. In one embodiment, passage retrieval, which computes the relevance score for a document based on the best matching passage, is utilized. Intuitively a score based on passage retrieval would not be influenced so much as traditional document-based retrieval by the existence of novel information. Therefore, it is expected that passage retrieval works better than standard retrieval models in terms of precision for top-ranked documents.

Figure 6:
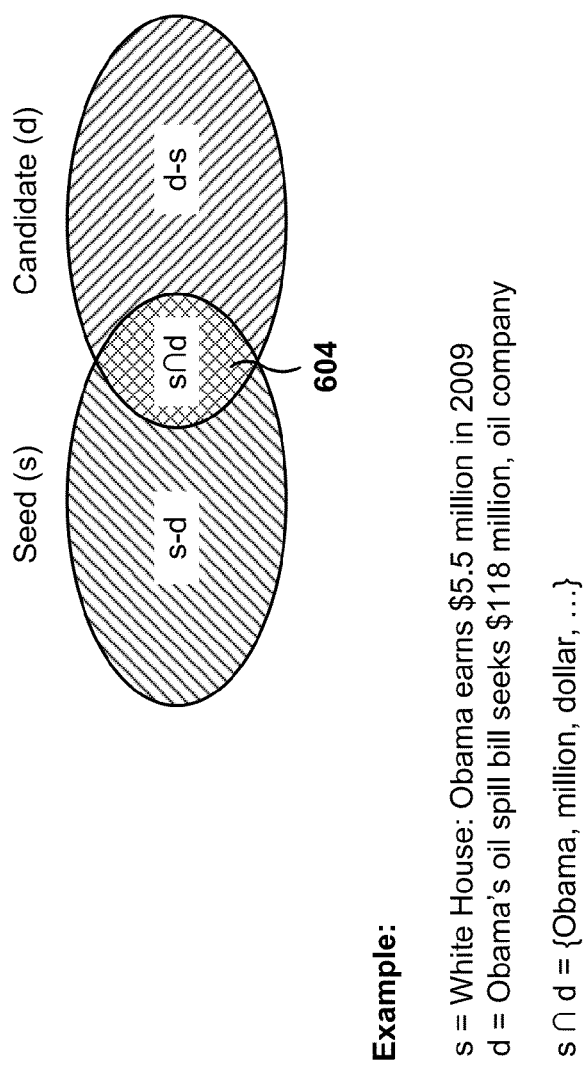
FIG. 6 illustrates the measurement of connection clarity, according to one embodiment.

FIG. 6 illustrates the measurement of connection clarity, according to one embodiment. Two stories should share a clear thread to make them topically cohesive, i.e., $s \cap d$ 604 should contain a clear topic rather than only uncorrelated words. As used herein, $s \cap d$ is the intersection of the words in s and the words in d. Both relevance and novelty signals can only model the word overlap between two articles s and d, and measure the size of overlap, i.e. $|s \cap d|$. However, it is often observed that pure word overlap between two news articles does not necessarily indicate relatedness. For example:

s="White House: Obama earns $5.5 million in 2009."
d="Obama's oil spill bill seeks $118 million, oil company."
$s \cap d$={Obama, million, dollar, ... }

The two articles s and d share words like "Obama," "million," and "dollar", and there is also novel information contained in the candidate d, but the articles are unrelated. Intuitively, in order to make two documents related, the documents should share a clear story thread that makes them topically cohesive. This can often be achieved by repeating the same topic, or a similar topic, which forms topical links that connect two documents together and make them related. However, word overlap may not necessarily form a clear topic overlap. For the above example, a set of words like "Obama," "million," and "dollar" are not discriminative enough to represent a specific topic. Another signal, connection clarity, is utilized to capture this heuristic. Arguably, the clearer the topical connection is, the more related the two documents will probably be.

One straightforward way for modeling connection clarity is to consider the topic distributions of the two articles. First, topics associated with each document are identified using probabilistic topic models, such as PLSA and LDA, and the negative KL-divergence between two distributions is calculated for the connection clarity score:

$$\text{clarity}(s, d) = -\sum_{t=1}^{N} P(t \mid s) \log \frac{P(t \mid s)}{P_\lambda(t \mid d)} \quad (1)$$

Where t denotes a topic and N is the total number of topics. In one embodiment, N=1,000, but other values are also possible. Further, $P_\lambda(t|d)=(1-\lambda)P(t|d)+\lambda P(t|C)$, which is a linearly smoothed topic distribution associated with document d, where the topic distribution of the whole collection P(t|C) is selected as the background model. Although there is no zero-probability problem, a smoothing strategy is utilized to decrease the effects of non-discriminative topics (i.e., topics associated with many documents). Intuitively, if both articles share the same clear/discriminative topic, the score will be high. However, this method suffers from a drawback: the method essentially estimates the connection size rather than the connection clarity. Consequently, two documents sharing many uncorrelated or loosely correlated topics may also receive high scores, although no topic has a large probability, which is counterintuitive.

Therefore, to better measure connection clarity directly based on the language usage of the "connection" (i.e., $s \cap d$), another method is utilized where the entropy of the language model (unigram distribution over words) behind $s \cap d$ 604 is utilized to measure the uncertainty of topics shared by the two documents. Intuitively, if $s \cap d$ is about a clear and discriminative story, the language model is usually characterized by large probabilities for a small number of topical terms, while if $s \cap d$ does not imply a clear connection (e.g., only consisting of uncorrelated words), the language model will be smoother. Thus, the entropy will be smaller in the former case than in the latter.

First, $s \cap d$ 604, the overlap of s and d, is defined using counts of words. Let $c(w, d_i)$ be the count of word w in document $d_i$. Then $c(w, s \cap d)$ is calculated as follows:

$$c(w, s \cap d) = \min\{c(w,s), c(w,d)\} \quad (2)$$

It is often not very accurate to estimate a language model $P(w|s \cap d)$ based on the text of $s \cap d$ alone, since $s \cap d$ may only contain a small set of words. Similar to the relevance model, $P(w|s \cap d)$ is estimated utilizing more evidence. The relevance model has been shown to perform well for estimating an accurate query language model in information retrieval. The relevance model $P(w|s \cap d)$ is estimated in terms of the joint probability of observing any term w together with terms from $s \cap d$. Assuming that w and all the words from $s \cap d$ are sampled independently and identically to each other, the relevance model is computed as follows:

$$P(w|s \cap d) \propto P(w, s \cap d) \propto \sum_{r \in R} P(w|r) \prod_{w' \in V} P(w'|r)^{c(w', s \cap d)} \quad (3)$$

Where r is a document of the model estimated from the corresponding single document, R is the set of documents that are associated with $s \cap d$, V is the vocabulary of the whole news collection, and $\prod_{w' \in V} P(w'|r)^{c(w', s \cap d)}$ is the likelihood of an individual document language model generating $s \cap d$.

The idea of the relevance model is to use the likelihood of generating $s \cap d$ of an individual document as the weight, and estimate a final language model based on weighted aggregation of term counts in the document set R. To improve both efficiency and effectiveness, R is restricted to contain only the top 50 documents that are most likely to generate $s \cap d$, but other number of top documents may also be utilized.

The entropy of $P(w|s \cap d)$ is then computed. Since the entropy of $P(w|s \cap d)$ is often affected significantly by common terms (e.g., 'the', 'and', ... ), a relative entropy or KL-divergence is calculated. The relative entropy, as the connection clarity score, essentially measures the language usage associated with $s \cap d$ as compared to the background language model of the collection as a whole.

$$\text{clarity}(s, d) = \sum_{w \in V} P(w \mid s \cap d) \log \frac{P(w \mid s \cap d)}{P(w \mid C)} \quad (4)$$

Using Equation (4), a larger score of connection clarity indicates a higher relatedness between the two documents.

Figure 7:
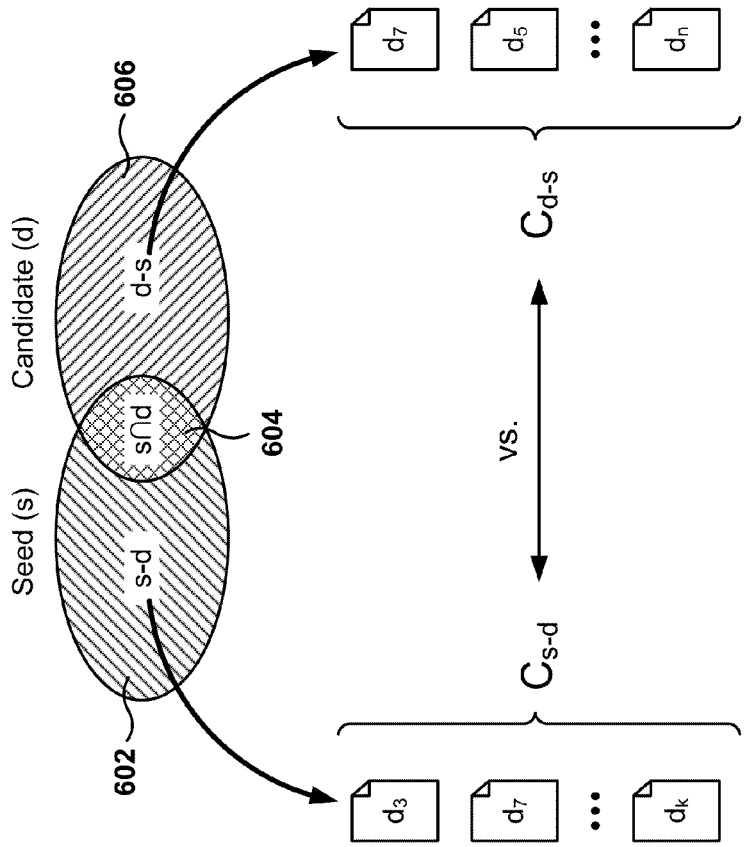
FIG. 7 illustrates the measurement of transition smoothness, according to one embodiment.

FIG. 7 illustrates the measurement of transition smoothness, according to one embodiment. Even if a candidate article satisfies all the above properties, would a user like to transit to this article after reading the current news? For example:

s="Toyota dismisses account of runaway Prius."
$d_1$="What to do if your car suddenly accelerates."
$d_2$="Toyota to build Prius at third Japan plant: report."

Given a seed s, users would be more likely to read candidate $d_1$ than candidate $d_2$. One possible reason is that $d_1$ and s are more coherent, and it would be natural to combine s and $d_1$ into one coherent article. Although, $d_2$ also connects well to s via "Toyota Prius," it would be odd if s and $d_2$ were combined because there is little continuity of senses between the two stories. As a result, users would be less likely to transit smoothly from s to $d_2$.

Another signal, transition smoothness, is introduced to model another dimension of relatedness. Transition smoothness measures how well a user's reading interests can transit from s to d. Since s∩d 604 is shared by two documents, intuitively there is more interest in the transition smoothness from (s–d) 602 to (d–s) 606, i.e., from the "known" information to the "novel" information. Further, the context c(w, s–d) for (s–d), and the context c(w, d–s) for (d–s) are defined as follows:

$$c(w,s-d)=c(w,s)-c(w,s\cap d) \quad (5)$$

$$c(w,d-s)=c(w,d)-c(w,s\cap d) \quad (6)$$

Since it is nontrivial to model transition smoothness directly, which needs deep understanding of natural languages, an estimate is used instead. Considering that if, in some context, an editor would like to put two "stories" (s–d) 602 and (d–s) 606 into one news article, it probably means that the two stories have a smooth transition, at least from that editor's perspective. Therefore, after analyzing a large collection of news articles, if two stories often occur in similar contexts, it may suggest that the stories are smooth in transition. Thus, it would be useful to compare "contexts" for (s–d) to (d–s).

A first approach is to model context using associated documents. Such a document-based context is represented as a vector of documents. Specifically, the context of (s–d), i.e., $\vec{C}_{s-d}$ is a |D|-dimension vector, where |D| is the total count of articles. The weight of each dimension $d_i$ is defined as g(s–d, $d_i$), where g can be any positive function. The relevance score of document $d_i$ with respect to "query" (s–d) is g(s–d, $d_i$). In one embodiment, the BM25 retrieval function is used to compute relevance scores. This implies that if a document is more relevant to (s–d), the document would play a more important role to determine the context of (s–d). Similarly, the context vector $\vec{C}_{d-s}$ is estimated for (d–s). In one embodiment, the transition smoothness score is computed using the cosine similarity between context vectors as follows:

$$\text{smoothness}(s, d) = \frac{\vec{C}_{s-d} \cdot \vec{C}_{d-s}}{\|\vec{C}_{s-d}\| \cdot \|\vec{C}_{d-s}\|} \quad (7)$$

In another embodiment, a word-based context is modeled. The word-based context is represented as a unigram language model. Specifically, the context of (s–d) and (d–s), i.e., P(w|s–d) and P(w|d–s), can also be estimated using the relevance model in a similar way as P(w|s∩d) is estimated. The two contexts can be compared in terms of their divergence. Due to the zero-probability problem, the Jensen-Shannon divergence model is used as follows:

$$\text{smoothness}(s, d) = \quad (8)$$
$$\frac{1}{2}\sum_{w\in V} P(w|s-d)\log\frac{P(w|s-d)}{P(w|M)} + \frac{1}{2}\sum_{w\in V} P(w|d-s)\log\frac{P(w|d-s)}{P(w|M)}$$

Where P(w|M)=0.5P(w|s–d)+0.5P(w|d–s). It is noted that both methods boil down to computing the similarity/distance between the contexts of two documents. The main difference is that the first method uses a document-based context representation, while the second uses a word-based representation.

Figures 8, 9:
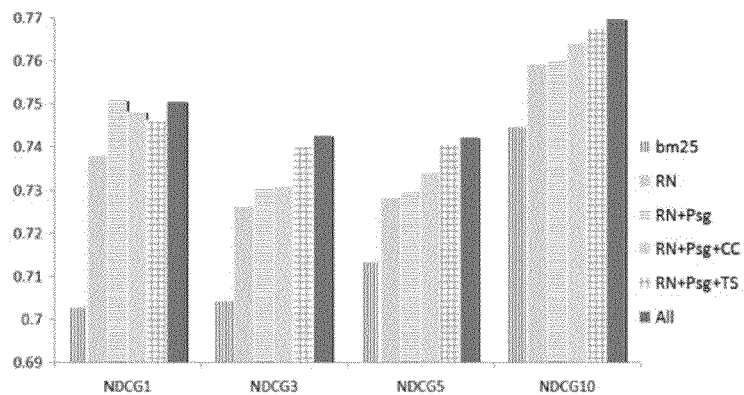
FIG. 8 show relatedness measurement results in accordance with one embodiment of the invention.
FIG. 9 shows an example of the effect of using different metrics when calculating relatedness, according to one embodiment.

FIG. 8 show relatedness measurement results in accordance with one embodiment of the invention. To construct a unified relatedness function, the four heuristics are utilized: relevance, novelty, connection clarity, and transition smoothness. The unified relatedness function is built to leverage the complementary relative strengths of the various heuristics, by employing a learning-to-rank framework, such as GBRank, although other frameworks may also be utilized. The framework combines the various relatedness features and learns a unified relatedness function.

In order to learn a unified relatedness function and quantitatively evaluate the models, a data set was used that included, not only a news database and a large set of seed news articles, but also judgments of related news for each seed article for the purpose of training and testing. A test collection was established and editorial judgments were collected. Furthermore, through constructing a test collection, it was evaluated if the definition of relatedness can be effectively identified by human assessors, and to what degree different assessors agree with each other in making judgments.

To construct a test collection, a subset of Yahoo! News articles was collected from Mar. 1, 2010, to Jun. 30, 2010. A list of 549 seed news was randomly generated from Jun. 10, 2010, to Jun. 20, 2010, with at least 2,000 visits. The seed articles were chosen for the mid-June period since a news article often has a very short active life and thus the recommended news in reality could be mostly comprised of older news and a few in the near future (i.e., late-June). The restriction of avoiding less popular news as seed articles was to reduce the cases that some assessors might be unfamiliar with the news stories so as to feel uncertain to make judgments.

To generate relatedness judgments for each seed article efficiently, a pooling technique was used, and assessors were asked to judge only a pool of top-ranked documents returned by various runs. Several information retrieval models were used, including cosine similarity with a raw TF and a log IDF, Okapi BM25 (k1=1.2, k3=1000, b=0.5), language models with Dirichlet prior smoothing (μ=2, 000), and language models with Jelinek-Mercer smoothing (λ=0.9), to retrieve documents from the collection. The body portion of both candidate and seed articles were used for indexing, leading to four runs. In order to improve diversity, for the language modeling approach with Dirichlet prior smoothing method, two other runs were added where the title and abstract (provided by Yahoo! News) portions of seed articles were indexed as "queries" respectively. Thus, six runs were generated in total.

A simple redundancy detection was used (cosine similarity) to filter out relatively obvious redundancy, and to remove near duplicate documents of which the similarity score passes a pre-specified redundancy threshold. In one embodiment, the redundancy threshold was set at 0.8, although other threshold values are also possible.

One difference from traditional information retrieval tasks is that only the top-ranked documents are of interest. Therefore, for each seed article, the top-ranked 15 documents (after redundancy filtering) from each run were pooled together to be judged, resulting in a set of 16,484 news documents in total to be judged for 549 seed news. Moreover, to investigate the consistency of assessor judgments, two documents were randomly selected for each seed, which would be judged by two different assessors, while all other documents would be judged by only one assessor.

A group of professional news editors from a commercial online news website performed the judging tasks. The judges were asked to judge the relationship of a candidate article to its corresponding seed news as one of four degrees: very related, somewhat related, unrelated, and redundant.

To learn a relatedness function, a learning-to-rank algorithm named GBRank was used. More specifically, the following notion was used: $x_i \in R^d$ as the feature vector for the i-th document pair (i.e., a seed and a candidate); $r_i$ as the editorial label of relatedness; and $f: R^d \rightarrow R$ as a relatedness function. Then, for total n editorial data, a loss function $L(\{x_i\}, \{r_i\}, f)$ was defined as follows:

$$L(\{x_i\},\{r_i\},f) = \Sigma_{(i,j) \in P_n}((r_i - r_j) - (f(x_i) - f(x_j)))^2 + \lambda \Sigma_{(i,j) \in \tau_n}(f(x_j) - f(x_j))^2 \quad (9)$$

Where $x_i$ is equal to $x_i$ if $x_i \geq 0$ and 0 otherwise, $x_j$ is equal to $x_j$ if $x_j \geq 0$ and 0 otherwise, $P_n$ is the set of preference pairs, and $\tau_n$ is the set of tied pairs. A stochastic functional gradient boosting technique is used to minimize equation (9) in the functional space using regression trees as weak learners, and obtain the relatedness function. In one embodiment, the used parameters for functional gradient boosting trees are number of nodes N=10, 15 for tree weak learners, number of trees T=600, shrinkage parameter v=0.03, 0.05, 0.07, data sampling rate s=0.5, 0.7, 0.8, and tied pairs weight $\lambda$=0.5, 1, 3.

Experimentally, both candidate and seed documents were processed by applying the Porter stemmer and removing stopwords using a total of 418 InQuery stopwords. Stopwords are high-frequency non-descriptive words. The average length of news bodies is not very long, only 97 words after preprocessing. Those candidate documents that have been judged by editors were then ranked. NDCG was used as a measure and NDCG scores at top 1, 3, 5, and 10 documents were reported.

Different retrieval models were compared utilizing the body text to index candidate documents (i.e., body indexing). For seeds (queries), title, abstract, and body indexing were tested. FIG. 8 shows the comparison of different retrieval models. It is observed that, among different methods to index seed documents (queries), body indexing tends to be better than abstract indexing, which is better than title indexing. This suggests that the title and abstract may lose useful information since title and abstract are "compressed."

By comparing the different retrieval models, BM25 proved best when using title or abstract indexing for seed documents, but when using body indexing, the two language modeling approaches work as well as BM25. Besides, cosine similarity performs surprisingly as well as or even better than language models in some cases, but its NDCG1 score appears relatively poor.

FIG. 9 shows an example of the effect of using different metrics when calculating relatedness, according to one embodiment. The different relatedness models were evaluated. Using a 5-fold cross validation strategy, the total 549 seed documents (queries) were split into 5 collections randomly. First, the standard retrieval models were combined using GBRank, and the resulting model is labeled as "RN" in FIG. 9. RN improves consistently and significantly over BM25, and the improvement is especially large for NDCG1. Since NDCG1 is most sensitive to the existence of redundant documents, it may suggest that the learned model RN can balance relevance and novelty well. Second, another model was trained by adding passage retrieval features. This model is labeled as "RN+Psg." Although RN+Psg did not introduce clear improvements to RN on NDCG5 and NDCG10, RN+Psg was boosted NDCG1 significantly.

Third, connection clarity was introduced using both instantiations of this heuristic described above. The experiments show that the first instantiation equation (1) does not help and even often hurts NDCG1 and NDCG3. The second instantiation, labeled "RN+Psg+CC," generated better results. RN+Psg+CC improved NDCG10 and NDCG5 over RN+Psg, although NDCG1 decreased slightly. It may suggest that connection clarity somehow tends to favor redundant documents, since the "connection" between duplicate stories is just this story, which would often be "clear".

Fourth, transition smoothness was added, which also has two instantiations, document-based context comparison and word-based context comparison. This model, labeled "RN+Psg+TS," outperformed RN+Psg in most cases.

Fifth, all heuristics were combined to construct a unified relatedness function, labeled as "All". This unified model performed best among all methods. This indicates that this method indeed captures more evidence of "relatedness" by going beyond relevance and novelty.

Figure 10:
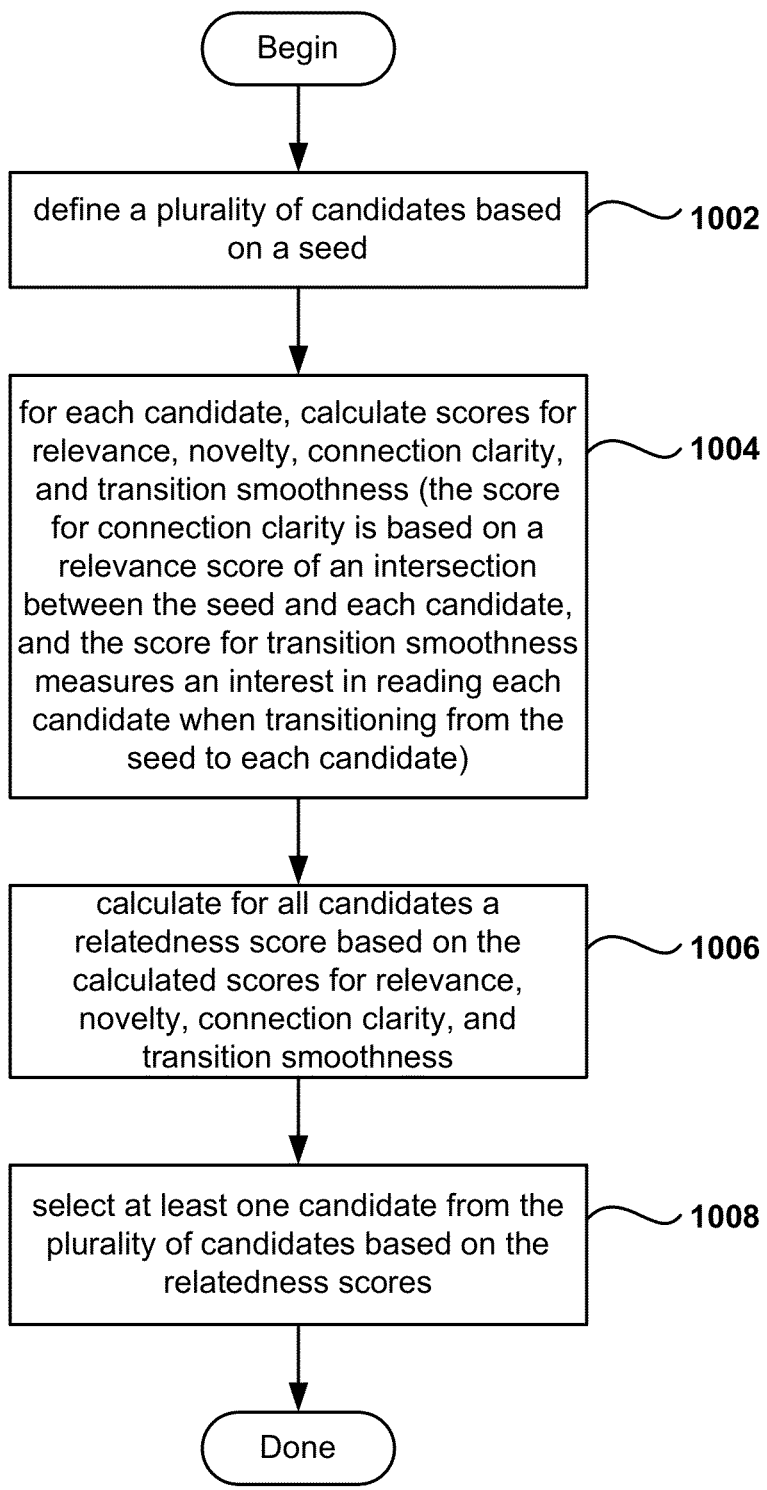
FIG. 10 shows the process flow for providing internet content in accordance with one embodiment of the invention.

FIG. 10 shows the process flow for providing internet content in accordance with one embodiment of the invention. In operation 1002, a plurality of candidates is defined based on the seed, such as a news article that has been selected by the user. Further, in operation 1004, scores are calculated for each candidate for relevance, novelty, connection clarity, and transition smoothness. The score for connection clarity is based on the relevance score of an intersection between the seed and each candidate, and the score for transition smoothness measures the interest in reading each candidate when transitioning from the seed to the candidate.

From operation 1004, the method flows to operation 1006, where a relatedness score for each candidate is calculated based on the previously calculated scores for relevance, novelty, connection clarity, and transition smoothness. Further, in operation 1008, the method selects at least one candidate from the plurality of candidates based on the relatedness scores. In one embodiment, the selected candidates are presented on a webpage to the user.

Figure 11:
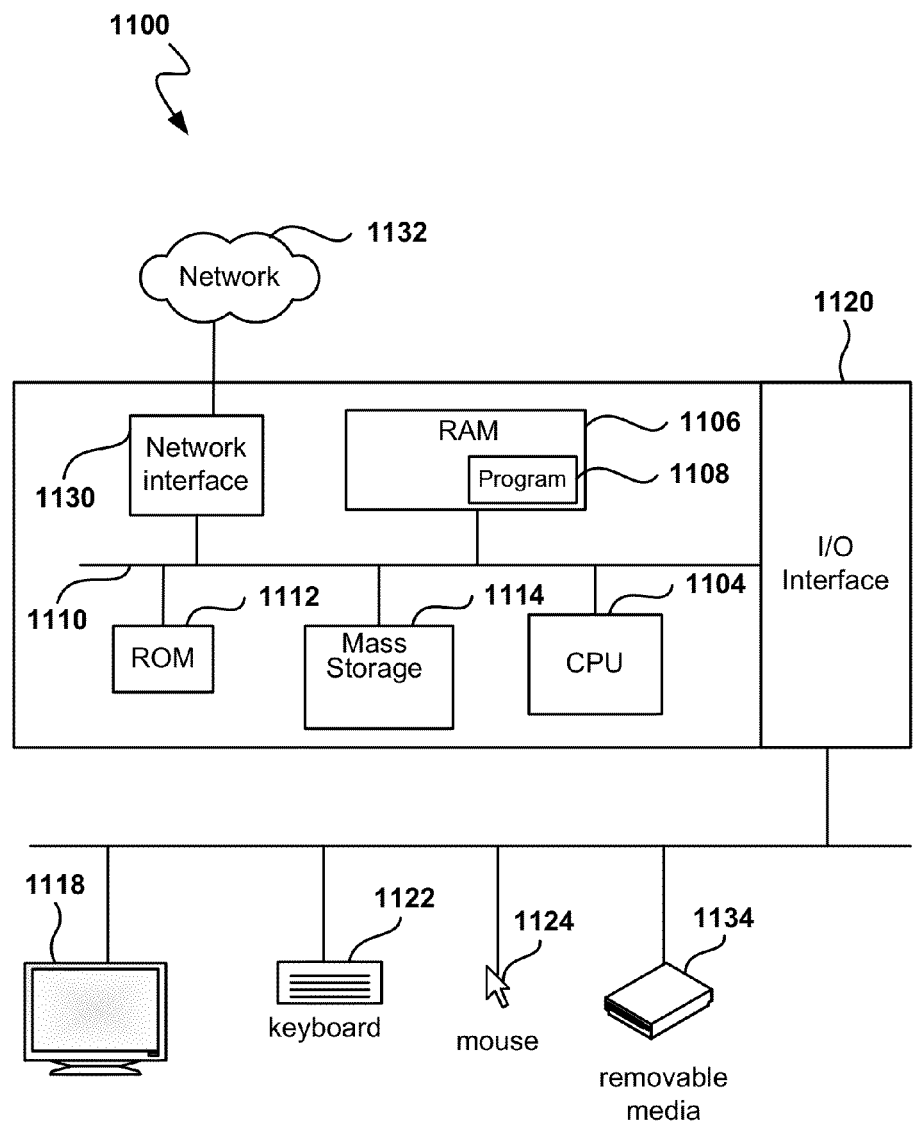
FIG. 11 is a simplified schematic diagram of a computer system for implementing embodiments of the present invention.

FIG. 11 is a simplified schematic diagram of a computer system for implementing embodiments of the present invention. FIG. 11 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1104, which is coupled through bus 1110 to random access memory (RAM) 1106, read-only memory (ROM) 1112, and mass storage device 1114. Computer program 1108 for searching related news articles resides in random access memory (RAM) 1106, but can also reside in mass storage 1114.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein, such as the web pages shown in FIGS. 2 and 3. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120. The invention can also be practiced in distributed computing environments where tasks are performed by remote processing devices that are linked through a wire-based or wireless network.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing internet content, the method comprising:
    defining a plurality of candidates based on a seed s;
    for each candidate d, calculating scores for relevance, novelty, connection clarity, and transition smoothness, wherein the score for connection clarity is based on a relevance score of an intersection between the seed and each candidate, wherein the score for transition smoothness measures an interest in reading each candidate when transitioning from the seed to each candidate;
    for each candidate, calculating a relatedness score based on the calculated scores for relevance, novelty, connection clarity, and transition smoothness; and
    selecting at least one candidate from the plurality of candidates based on the relatedness scores, wherein operations of the method are executed by a processor.

2. The method as recited in claim 1, wherein the score for connection clarity is further based on topic distributions of the seed and each candidate.

3. The method as recited in claim 1, wherein the score for connection clarity is calculated with a formula of $$\text{connection clarity}(s, d) = -\sum_{t=1}^{N} P(t \mid s) \log \frac{P(t \mid s)}{P_\lambda(t \mid d)},$$

wherein t is a topic, N is a number of topics, and $\lambda$ is a smoothing factor, wherein a conditional probability of variable A given variable B is denoted as P(A|B).

4. The method as recited in claim 1, wherein the score for connection clarity is calculated with a formula of $$\text{connection clarity}(s, d) = \sum_{w \in V} P(w \mid s \cap d) \log \frac{P(w \mid s \cap d)}{P(w \mid C)},$$

wherein w is a word, V is a vocabulary of a whole news collection, C is a corpus of news documents, and $s \cap d$ is an intersection of words in s and words in d, wherein a conditional probability of variable A given variable B is denoted as P(A|B).

5. The method as recited in claim 1, wherein the score for transition smoothness is based on comparing contexts for (s−d) and (d−s), wherein a difference of words in document A minus words in document B is denoted as (A−B).

6. The method as recited in claim 1, wherein the score for transition smoothness is calculated with a formula of $$\text{smoothness}(s, d) = \frac{\vec{C}_{s-d} \cdot \vec{C}_{d-s}}{\|\vec{C}_{s-d}\| \cdot \|\vec{C}_{d-s}\|},$$

wherein $\vec{C}_{x-y}$ is a context vector of x−y, wherein a length of a vector z is denoted as $\|z\|$, wherein a difference of words in document A minus words in document B is denoted as (A−B).

7. The method as recited in claim 1, wherein the score for transition smoothness is calculated with a formula of $$\text{smoothness}(s, d) = \frac{1}{2} \sum_{w \in V} P(w \mid s-d) \log \frac{P(w \mid s-d)}{P(w \mid M)} + \frac{1}{2} \sum_{w \in V} P(w \mid d-s) \log \frac{P(w \mid d-s)}{P(w \mid M)},$$

wherein w is a word, V is a vocabulary of a whole news collection, wherein P(w|M) is equal to 0.5P(w|s−d)+

0.5P(w|d−s), wherein a difference of words in document A minus words in document B is denoted as (A−B), wherein a conditional probability of variable X given variable Y is denoted as P(X|Y).

8. The method as recited in claim 1 further including:
eliminating candidates that are substantially identical to the seed.

9. The method as recited in claim 1, wherein calculating the relatedness score utilizes a learning to rank framework that combines relevance, novelty, connection clarity, and transition smoothness.

10. The method as recited in claim 1, further including:
presenting the selected at least one candidate from the plurality of candidates to a user.

11. A non-transitory computer-readable storage medium storing a computer program, the computer program comprising:
program instructions for defining a plurality of candidates based on a seed s;
program instructions for calculating, for each candidate d, scores for relevance, novelty, connection clarity, and transition smoothness, wherein the score for connection clarity is based on a relevance score of an intersection between the seed and each candidate, wherein the score for transition smoothness measures an interest in reading each candidate when transitioning from the seed to each candidate;
program instructions for calculating, for each candidate, a relatedness score based on the calculated scores for relevance, novelty, connection clarity, and transition smoothness; and
program instructions for selecting at least one candidate from the plurality of candidates based on the relatedness scores.

12. The non-transitory computer-readable storage medium as recited in claim 11, wherein the program instructions for defining the plurality of candidates further includes:
program instructions for using a standard information retrieval model to retrieve a set of documents using the seed as a query; and
program instructions for removing redundant articles to obtain the plurality of candidates.

13. The non-transitory computer-readable storage medium as recited in claim 11, wherein the relatedness score is calculating using a retrieval model selected from a group consisting of a vector space model, a classic probabilistic model, and a language model.

14. The non-transitory computer-readable storage medium as recited in claim 11, wherein the seed includes title, abstract, and body.

15. The non-transitory computer-readable storage medium as recited in claim 11, wherein the score for connection clarity is further based on topic distributions of the seed and each candidate.

16. A method for providing news articles, the method comprising:
defining a plurality of news candidates based on a seed article s selected by a user;
for each news candidate d, calculating scores for relevance, novelty, connection clarity, and transition smoothness, wherein the score for connection clarity is based on a relevance score of an intersection between the seed article and each news candidate, wherein the score for transition smoothness measures an interest in reading each news candidate when transitioning from the seed article to each news candidate;
for each news candidate, calculating a relatedness score based on the calculated scores for relevance, novelty, connection clarity, and transition smoothness; and
selecting based on the relatedness scores a subset of news candidates from the plurality of news candidates for presentation to the user, wherein operations of the method are executed by a processor.

17. The method as recited in claim 16, wherein the score for connection clarity is calculated with a formula of $$\text{connection clarity}(s, d) = -\sum_{t=1}^{N} P(t \mid s) \log \frac{P(t \mid s)}{P_\lambda(t \mid d)},$$

wherein t is a topic, N is a number of topics, and λ is a smoothing factor, wherein a conditional probability of variable A given variable B is denoted as P(A|B).

18. The method as recited in claim 16, wherein the score for connection clarity score is calculated with a formula of $$\text{connection clarity}(s, d) = \sum_{w \in V} P(w \mid s \cap d) \log \frac{P(w \mid s \cap d)}{P(w \mid C)},$$

wherein w is a word, V is a vocabulary of a whole news collection, C is a corpus of news documents, and s∩d is an intersection of words in s and words in d, wherein a conditional probability of variable A given variable B is denoted as P(A|B).

19. The method as recited in claim 16, wherein the score for transition smoothness is calculated with a formula of $$\text{smoothness}(s, d) = \frac{\vec{C}_{s-d} \cdot \vec{C}_{d-s}}{\|\vec{C}_{s-d}\| \cdot \|\vec{C}_{d-s}\|},$$

wherein $\vec{C}_{x-y}$ is a context vector of x−y, wherein a length of a vector z is denoted as $\|z\|$, wherein a difference of words in document A minus words in document B is denoted as (A−B).

* * * * *